US011620756B2

(12) United States Patent
Ding et al.

(10) Patent No.: US 11,620,756 B2
(45) Date of Patent: Apr. 4, 2023

(54) TARGET OBJECT TRACKING METHOD AND APPARATUS, AND TERMINAL DEVICE

(71) Applicant: Shenzhen Intellifusion Technologies Co., Ltd., Guangdong (CN)

(72) Inventors: Xu Ding, Guangdong (CN); Wenze Hu, Guangdong (CN)

(73) Assignee: Shenzhen Intellifusion Technologies Co., Ltd., Guangdong (CN)

( * ) Notice: Subject to any disclaimer, the term of this patent is extended or adjusted under 35 U.S.C. 154(b) by 0 days.

(21) Appl. No.: 17/623,891

(22) PCT Filed: Oct. 27, 2020

(86) PCT No.: PCT/CN2020/124092
§ 371 (c)(1),
(2) Date: Dec. 30, 2021

(87) PCT Pub. No.: WO2021/120866
PCT Pub. Date: Jun. 24, 2021

(65) Prior Publication Data
US 2022/0366572 A1    Nov. 17, 2022

(30) Foreign Application Priority Data
Dec. 18, 2019 (CN) .......................... 201911313503.3

(51) Int. Cl.
*G06T 7/246* (2017.01)
*G06V 10/22* (2022.01)
(Continued)

(52) U.S. Cl.
CPC ............ *G06T 7/246* (2017.01); *G06V 10/225* (2022.01); *G06T 7/215* (2017.01);
(Continued)

(58) Field of Classification Search
CPC .......... G06T 7/246; G06T 2207/10016; G06T 7/215; G06V 10/225; G06V 2201/07; G06V 40/161; G06V 10/62
(Continued)

(56) References Cited

U.S. PATENT DOCUMENTS

2019/0045192 A1*    2/2019    Socek ................... H04N 19/573
2019/0045193 A1*    2/2019    Socek ..................... G06T 7/277
(Continued)

FOREIGN PATENT DOCUMENTS

CN       108256511 A       7/2018
CN       108596109 A       9/2018

*Primary Examiner* — Kenny A Cese

(57) ABSTRACT

The present application is applicable to the technical field of image processing, and provides a target object tracking method and an apparatus, and a terminal device. The target object tracking method includes: obtaining an image sequence including a target object, wherein the image sequence includes a plurality of image; analyzing the plurality of image, and determining a motion vector and a motion vector residual of the target object in a current image; and inputting the motion vector, the motion vector residual, and a known target region of the target object in a previous image into a first target detection network, and determining a predicted target region of the target object in the current image. The present application can reduce the calculation amount and thus improve the operation speed of target object tracking.

14 Claims, 7 Drawing Sheets

(51) Int. Cl.
*G06V 10/62* (2022.01)
*G06T 7/215* (2017.01)
*G06V 40/16* (2022.01)

(52) U.S. Cl.
CPC .... *G06T 2207/10016* (2013.01); *G06V 10/62* (2022.01); *G06V 40/161* (2022.01); *G06V 2201/07* (2022.01)

(58) Field of Classification Search
USPC .......................................................... 382/103
See application file for complete search history.

(56) References Cited

U.S. PATENT DOCUMENTS

| | | | | |
|---|---|---|---|---|
| 2019/0327486 | A1* | 10/2019 | Liao ........................ | G06V 10/75 |
| 2020/0186809 | A1* | 6/2020 | Mukherjee .............. | G06T 9/002 |
| 2020/0193609 | A1* | 6/2020 | Dharur .................... | G06T 7/254 |
| 2021/0166450 | A1* | 6/2021 | Xu .......................... | G06T 11/00 |

* cited by examiner

TARGET OBJECT TRACKING METHOD AND APPARATUS, AND TERMINAL DEVICE

CROSS REFERENCE TO RELATED APPLICATIONS

This application is a national phase entry under 35 U.S.C § 371 of International Application No. PCT/CN2020/124092, filed on Oct. 27, 2020, which claims priority to Chinese Patent Application No. 201911313503.3, filed on Dec. 18, 2019, the entire contents of all of which are incorporated herein by reference.

BACKGROUND

1. Technical Field

The present disclosure generally relates to the technical field of image processing, and especially relates to a target object tracking method and an apparatus, and a terminal device.

2. Description of Related Art

Video target tracking is a hotspot of computer vision, provides support for video analysis, video retrieval and behavior understanding, and has a more and more widely research value and application prospects in the fields of military guidance, human-computer interaction, medical diagnosis and so on. However, conventional target tracking algorithms have low accuracy and more limitations.

Whereas a good effect and a low speed are occurred in the tracking algorithm using a convolutional neural network thereof, and most convolutional neural networks are calculated by using RGB channels of images. For the tracking algorithm, it needs information of two images before and after to find out which targets have moved in the two images, so that two images of image data need to be input during calculation, which leads to a slow speed of the algorithm due to a large amount of calculation.

SUMMARY

The technical problems to be solved: in view of the shortcomings of the related art, the present disclosure provides a target object tracking method and an apparatus, and a terminal device which can overcome the problems in the related art above mentioned.

The technical solution adopted for solving technical problems of the present disclosure is:

a target object tracking method according to an embodiment of the present disclosure of the present disclosure includes:

obtaining an image sequence including a target object, wherein the image sequence includes a plurality of images;

analyzing the plurality of images, to determine a motion vector and a motion vector residual of the target object in a current image; and inputting the motion vector, the motion vector residual and a known target region of the target object in a previous image into a first target detection network, to determine a predicted target region of the target object in the current image.

Optionally, the method further includes: encoding a video image, to obtain the image sequence, which including:

obtaining the video image including the target object;

for each target image in the video image, dividing the target image into a plurality of macro blocks with preset sizes, and calculating a pixel value corresponding to each macro block;

taking two adjacent images from each target image, and calculating similarity of the two adjacent images based on the pixel value of each macro block of the two adjacent images; and dividing a plurality of target images with similarity meeting preset requirements into a group to be encoded, to obtain the image sequence, wherein only complete data of a first target image is reserved, and other target images are calculated according to corresponding previous target images thereof.

In a second aspect, a target object tracking apparatus according to an embodiment of the present disclosure includes:

an acquisition module configured to obtain an image sequence including a target object, wherein the image sequence includes a plurality of images;

an analysis module configured to analyze the plurality of images, to determine a motion vector and a motion vector residual of the target object in a current image; and a predicted target region determination module configured to input the motion vector, the motion vector residual and a known target region of the target object in a previous image into a first target detection network, to determine a predicted target region of the target object in the current image.

In a third aspect, a terminal device according to an embodiment of the present disclosure includes a memory, a processor and computer programs stored in the memory and performed by the processor to implement steps of the target object tracking method above mentioned in the first aspect.

In a fourth aspect, a computer readable storage medium according to an embodiment of the present disclosure is configured to store computer programs performed by a processor to implement steps of the target object tracking method above mentioned in the first aspect.

In a fifth aspect, a computer program product according to an embodiment of the present disclosure is configured to be performed by a terminal device to implement steps of the target object tracking method above mentioned in the first aspect.

It is understood that beneficial effects of the second aspect to the fifth aspect can be referred to related descriptions of the first aspect, which is not be repeated here.

Compared with the related art, the present disclosure provides the advantages as below.

The target object tracking method of the present disclosure first obtains the image sequence including the target object, then analyzes the plurality of images in the image sequence, determines the motion vector and the motion vector residual of the target object in the current image, and then inputs the motion vector, the motion vector residual and the known target region of the target object in the previous image into the first target detection network, to obtain the predicted target region of the target object in the current image, thereby implementing to track the target object in the current image. Only the motion vector, the motion vector residual and the known target region of the target object in the previous image are required to be input into the target detection network when determining the predicted target region, and the motion vector, the motion vector residual and the known target region are much smaller than data of two images in a conventional method, therefore, not only the calculation amount can be reduced, but also the calculation speed of tracking the target object can be improved.

It should be understood that both the foregoing general description and the following detailed description are only exemplary and explanatory, rather than being restrictive of the present disclosure.

BRIEF DESCRIPTION OF THE DRAWINGS

In order to more clearly understand the technical solution hereinafter in embodiments of the present disclosure, a brief description to the drawings used in detailed description of embodiments hereinafter is provided thereof. Obviously, the drawings described below are some embodiments of the present disclosure, for one of ordinary skill in the art, other drawings can be obtained according to the drawings below on the premise of no creative work.

DETAILED DESCRIPTION

Video target tracking is a hotspot of computer vision, provides support for video analysis, video retrieval and behavior understanding, and has a more and more widely research value and application prospects in the fields of military guidance, human-computer interaction, medical diagnosis and so on. However, conventional target tracking algorithms have low accuracy and more limitations.

Whereas a good effect and a low speed are occurred in the tracking algorithm using a convolutional neural network thereof, and most convolutional neural networks are calculated by using RGB channels of images. For the tracking algorithm, it needs information of two images before and after to find out which targets have moved in the two images, so that two images of image data need to be input during calculation, which leads to a slow speed of the algorithm due to a large amount of calculation.

Based on the above problems, the target object tracking method of the present disclosure first obtains an image sequence including a target object, then analyzes a plurality of images in the image sequence, determines a motion vector and a motion vector residual of the target object in a current image, and then inputs the motion vector, the motion vector residual and a known target region of the target object in a previous image into a first target detection network, to obtain a predicted target region of the target object in the current image, thereby implementing to track the target object in the current image. Only the motion vector, the motion vector residual and the known target region of the target object in the previous image are required to be input into the target detection network when determining the predicted target region, and the motion vector, the motion vector residual and the known target region are much smaller than data of two images in a conventional method, therefore, not only a calculation amount can be reduced, but also a calculation speed of tracking the target object can be improved.

Figure 1:
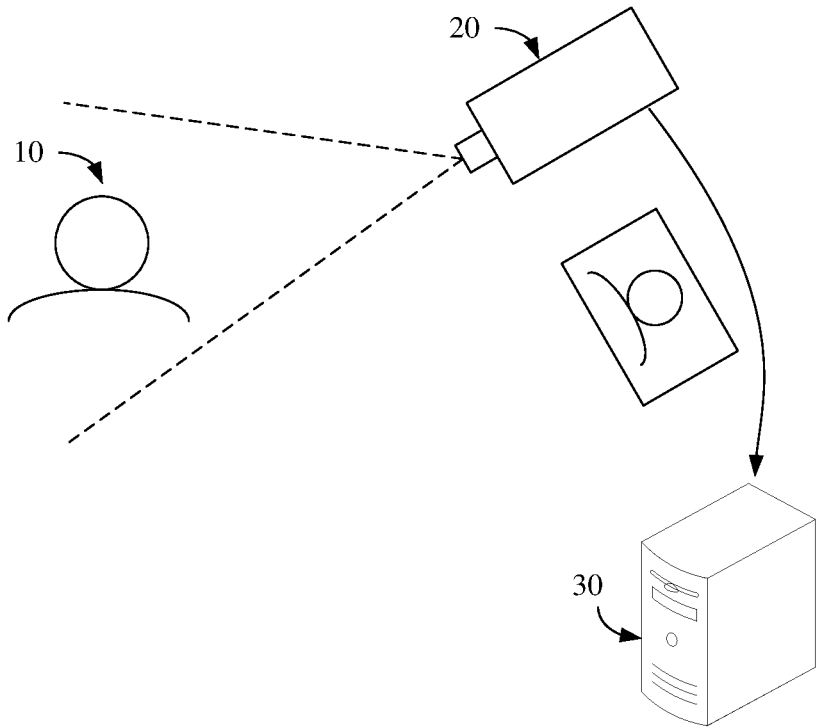
FIG. 1 is a schematic view of an application scenario of a target object tracking method in accordance with an embodiment of the present disclosure.

For example, an embodiment of the present disclosure can be applied to an exemplary scenario shown in FIG. 1. In the scenario, an image capturing device 20 is configured to capture a video image including a target object 10 and encode the video image, to obtain an image sequence including the target object 10. For example, an H264 video compression algorithm can be used to encode the video image, so as to obtain the image sequence including the target object. The image sequence can include P images, and a P-th image is a forward reference image; when the P-th image is compressed and encoded, it only needs to refer to a previous image that has processed. A sever 30 is configured to analyze the plurality of images, to determine the motion vector and the motion vector residual of the target object in the current image, and then input the motion vector, the motion vector residual and the known target region of the target object in the previous image into a trained target detection network, to obtain the predicted target region of the target object in the current image, thereby implementing to track the target object in the current image.

In order to better understand the technical solution of the present disclosure by one of ordinary skill in the art, the technical solutions of the present disclosure will be clearly and completely described below with reference to FIG. 1. Obviously, the implementation embodiment in the description is a part of the present disclosure implementation examples, rather than the implementation of all embodiments, examples. According to the described embodiment of the present disclosure, all other embodiments obtained by one of ordinary skill in the art on the premise of no creative work are within the protection scope of the present disclosure.

Figure 2:
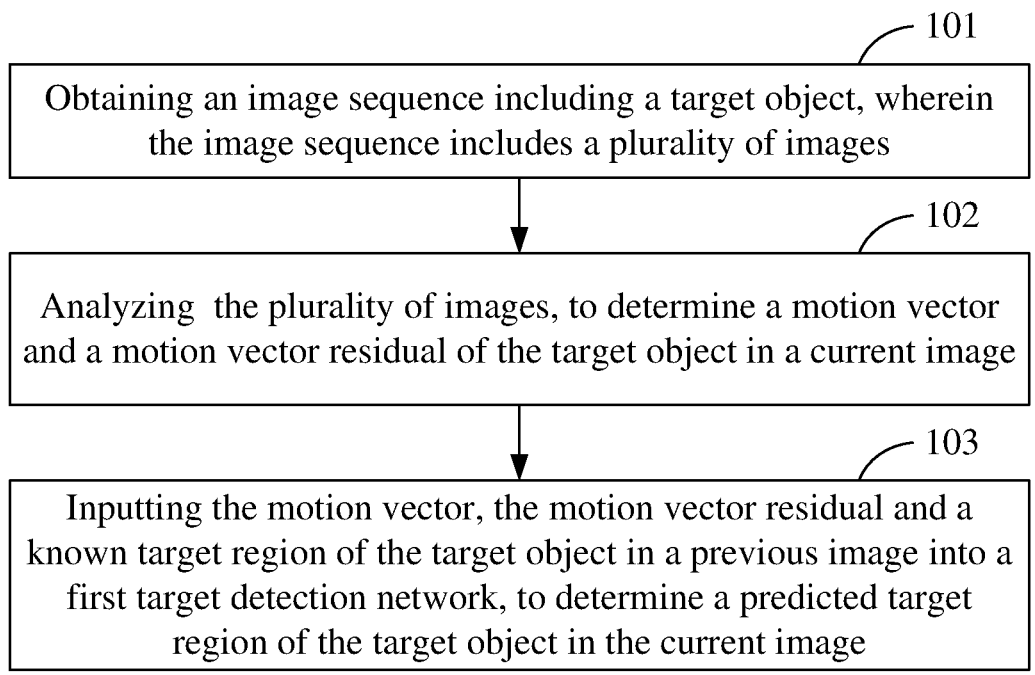
FIG. 2 is a flowchart of the target object tracking method in accordance with an embodiment of the present disclosure.

Referring to FIG. 2, a flowchart of the target object tracking method in accordance with an embodiment of the present disclosure is provided, and the target object tracking method is described in detail as follows:

step 101, obtaining an image sequence including a target object, wherein the image sequence includes a plurality of images.

The image sequence can be an image sequence obtained by encoding the video image through the H264 video compression algorithm. The H264 video compression algorithm mainly includes intra prediction compression, inter prediction compression, integer discrete cosine transform, and adaptive binary arithmetic coding (CABAC) compression.

The image sequence can include the plurality of images, typically including an I-th image, a B-th image, and the P-th image, wherein the I-th image is a key image and obtained by an intra compression technology; the B-th image is a bidirectional reference image and is obtained by an inter compression technology, and a previous image and a next image are referred during compressing the B-th image; the P-image is the forward reference image and is obtained by an inter prediction compression technology. The P-th image is performed compression based on the previous image that has processed, and motion estimation and a compensation of the target object. In some embodiments, the target object can be tracked by the P images in the image sequence.

The above method further includes: encoding a video image to obtain the image sequence, which can include:

obtaining the video image including the target object;

for each target image in the video image, dividing the target image into a plurality of macro blocks with preset sizes, and calculating a pixel value corresponding to each macro block;

taking two adjacent images from each target image, and calculating similarity of the two adjacent images based on the pixel value of each macro block of the two adjacent images; and dividing a plurality of target images with similarity meeting preset requirements into a group to be encoded, to obtain the image sequence, wherein only complete data of a first target image is reserved, and other target images are calculated according to corresponding previous target images thereof.

Specifically, after obtaining the video image, each image can be divided into a plurality of macro blocks by a size of a 16×16 region (naturally, the macro block can also be divided by a size of an 8×8 region), and then calculating pixel values of the plurality of macro blocks, to obtain the pixel value of each macro block. It should be noted that a relatively flat image is divided into the plurality of macro blocks by the size of the 16×16 region, so that the macro block with the size of 16×16 can be further divided into a plurality of small sub-blocks, in order to obtain a higher compression rate, for example, the macro block with the size of 16×16 can be divided into the plurality of sub-blocks with a size such as 8×16, 16×8, 8×8, 4×8, 8×4 and 4×4, etc. For example, in the case that the macro block is mostly a blue background, if a partial image of the target object is within the macro block, the macro block with the size of 16×16 can be divided into the plurality of sub-blocks in order to better process the partial image of the target object, so that more efficient data of the target object can be obtained after performing intra compression on the image of the target object.

There are two main types of data redundancy in video data: one is temporal data redundancy and the other is spatial data redundancy, wherein the temporal data redundancy is the largest. It is assumed that the camera captures 30 images per second, and data of the 30 images are mostly correlated. For the images with particularly close relations, data of only one image needs to be stored, and other images can be predicted by the one image according to a certain rule, thereby the temporal data of the video data is most redundant.

In order to compress data of related images by a prediction method, each image needs to be grouped. In the grouping process, two adjacent images can be taken out every time for performing macro block comparison therebetween, to calculate similarity of the two adjacent images, so that a correlation degree of the two adjacent images can be found to be very high through performing macro block scanning and macro block search on the two adjacent images, in this way, it can be found that the correlation degree of the group of images is very high. Therefore, the images with high similarity can be divided into the same group. For example, in some adjacent images, the pixels with differences are generally only within 10% points, a change of a brightness difference is not more than 2%, and a change of a chroma difference is only within 1%. Such images can be divided into the same group.

Step 102, analyzing the plurality of images, to determine a motion vector and a motion vector residual of the target object in a current image.

In some embodiments, the step 102 specifically includes: determining the motion vector and the motion vector residual of the target object in the current image, based on a position of the target object in a previous image, and a position of the target object in the current image.

The number of channels corresponding to the motion vector can be 2, and the number of channels corresponding to the residual of the motion number can be 3.

In the process of image compression, two adjacent images can be taken out from a header of a buffer, to perform macro block scanning on the two adjacent images. In the case that the target object exists in one of the two adjacent images, the target object is searched in an adjacent position (in a search window) of the other of the two adjacent images. If the target object is searched in the other of the two adjacent images, the motion vector of the target object can be calculated based on the positions of the target object in the two adjacent images. For example, if the position of the target object in the previous image is a first position and the position in the next image is a second position, the motion vector of the target object can be determined, according to the first position and the second position; the motion vector with a magnitude same as a distance between the first position and the second position, and the motion vector with a direction pointing from the first position to the second position.

After the motion vector is obtained, the same part of the two images is removed, to obtain the motion vector residual of the target object in the current image, and at the moment, the current image can be obtained by only performing compression coding on the motion vector and the motion vector residual. Therefore, the plurality of images can be analyzed based on a coding protocol, and the motion vector and the motion vector residual of the target object in the current image can be determined based on the position of the target object in the previous image, and the position of the target object in the current image.

The video image can be compressed by using an H264 coding protocol, to obtain the image sequence, and correspondingly, the two images can be analyzed based on the H264 coding protocol, to determine the motion vector and the motion vector residual of the target object in the current image.

Figure 3:
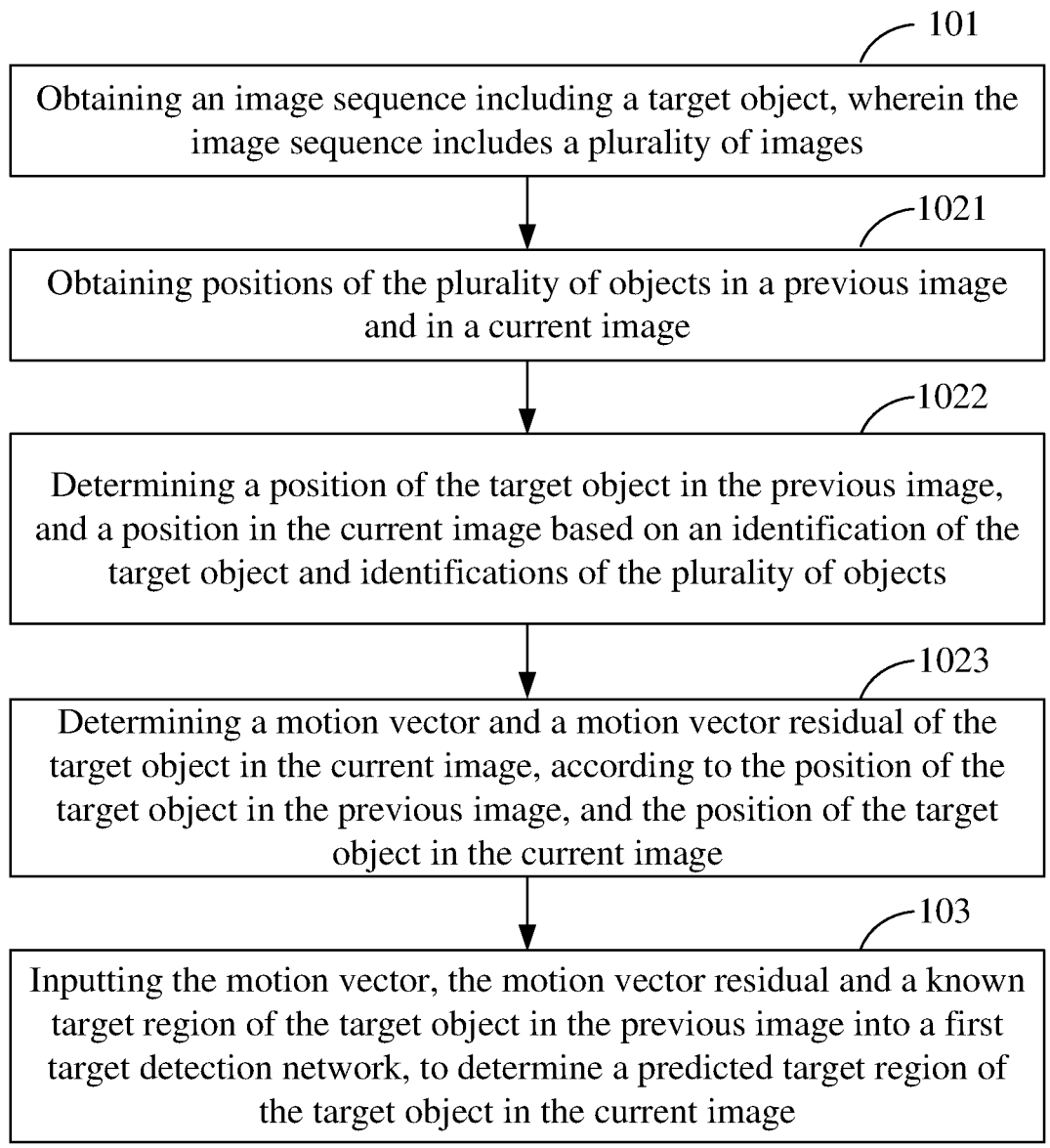
FIG. 3 is a detailed flowchart of the target object tracking method of FIG. 2.

In a possible implementation, referring to FIG. 3, when the image includes a plurality of objects, with each object corresponding to an identification, the step 102 can include the following steps:

step 1021, obtaining positions of the plurality of objects in the previous image and in the current image.

In the step 1021, an identification corresponding to each object that has identified in the previous image can be set, and the identification of the same object is unchanged in each of subsequent images, so as to identify each object in the next image. In this way, a corresponding relationship of each object between the two images can be determined, according to the identification of each object.

For example, taking three objects as an example: a first object, a second object and a third object are respectively identified in the previous image, to obtain respective first positions of the first, second and third objects, and a first identification corresponding to the first object is set, a second identification corresponding to the second object is set, and a third identification corresponding to the third object is set. Three objects are also identified in the current image. At this time, corresponding relationships between each of the three objects in the current image, and the first object, the second object and the third object in the previous image can be determined, respectively, according to identifications of the three objects that have identified in the current image. Thus, the respective first positions of the first object, the second object and the third object in the previous image can be obtained, and respective second positions of the three objects in the current image can also be obtained.

step 1022, determining the position of the target object in the previous image and the position in the current image, based on an identification of the target object and identifications of the plurality of objects.

For example, taking the three objects in the step 1021 as an example, when the identification of the target object is the first identification, the first position of the target object in the previous image, and the second position of the target object in the current image can be determined, according to the first identification. Specifically, a Hungarian algorithm can be used to match the first position and the second position of each target object.

It should be noted that the target object can be any one of the plurality of objects, or any number of the plurality of objects, which is not limited in the embodiment of the present disclosure. A specific working process that the target object is any number of the plurality of objects can be referred to the corresponding process in the embodiment of the above method, which is not repeated here.

step 1023, determining the motion vector and the motion vector residual of the target object in the current image, according to the position of the target object in the previous image, and the position of the target object in the current image.

After the first position of the target object in the previous image, and the second position of the target object in the current image are determined in the step 1022, correspondingly, the motion vector and the motion vector residual of the target object in the current image can be determined, according to the first position and the second position. The magnitude of the motion vector is the distance between the first position and the second position, and the direction of the motion vector is from the first position to the second position.

In the case that the target object is any number of the plurality of objects, the motion vector and the motion vector residual of each target object in the current image can be accordingly determined, according to the first position of each target object in the previous image, and the second position of each target object in the current image.

step 103, inputting the motion vector, the motion vector residual and a known target region of the target object in the previous image into a first target detection network, to determine a predicted target region of the target object in the current image.

In the step 103, the motion vector and the motion vector residual of the target object, and the known target region of the target object in the previous image can be input to a target detection network that has trained, to determine the predicted target region of the target object in the current image. The target detection network can be trained by the motion vector, the motion vector residual and a target region of the target object.

Figure 4:
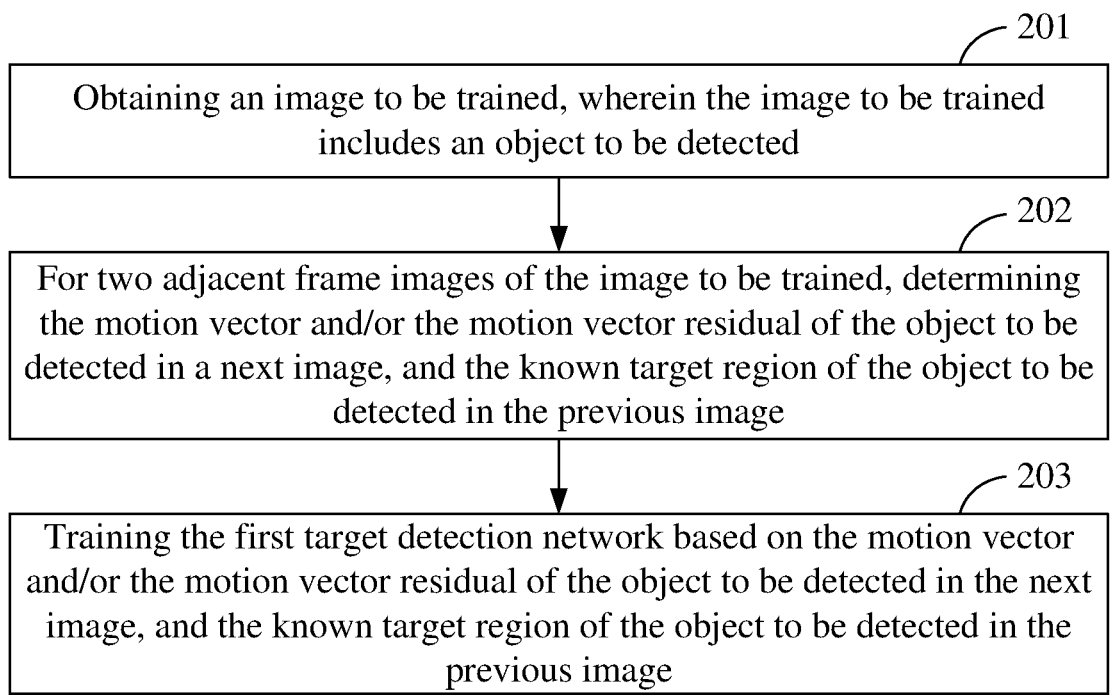
FIG. 4 is a flowchart of training a first target detection network of the target object tracking method in accordance with an embodiment of the present disclosure.

In some embodiments of the present disclosure, the target object tracking method can further include: training the first target detection network, referring to FIG. 4, the step of training the first target detection network can include:

step 201, obtaining an image to be trained, wherein the image to be trained includes an object to be detected;

step 202, for two adjacent images of the image to be trained, determining the motion vector and/or the motion vector residual of the object to be detected in a next image, and the known target region of the object to be detected in the previous image; and step 203, training the first target detection network based on the motion vector and/or the motion vector residual of the object to be detected in the next image, and the known target region of the object to be detected in the previous image.

The first target detection network is a target detection network based on Regions of interest, and the step 203 can specifically include:

step A1, inputting the motion vector and/or the motion vector residual of the object to be detected in the next image, into the target detection network based on Regions of interest, and taking the known target region of the object to be detected in the previous image, as a region of interest of the target detection network based on Regions of interest; and step B1, training the target detection network based on Regions of interest through the motion vector and/or the motion vector residual of the object to be detected in the next image, and the region of interest.

A RFCN (Region-based full convolution Networks) network is initially applied to a detection field, a RPN (Region pro-active Networks) layer in the RFCN network is used to generate the region of interest ROI (Region of interest). In an embodiment of the present disclosure, in order to implement to target tracking, for the previous image, the target to be tracked already exists, the positions of the targets are also known, and known target image boxes can be regarded as the ROIs generated by the RPN layers, so that the target detection network based on Regions of interest in the present embodiment can remove the RPN layer of the FRCN network, to directly take the target box of the previous image as the ROI for subsequent calculation. Other calculation processes of the whole RFCN network are consistent with an original RFCN network algorithm, which only removes the RPN layer of the RFCN network.

The motion vector of the object to be detected in the next image can be input into the target detection network based on Regions of interest, and the known target region of the object to be detected in the previous image can be taken as a region of interest of the target detection network based on Regions of interest, to train the target detection network based on Regions of interest. That is, the motion vector with two channels can be input into the target detection network based on Regions of interest, and the target detection network based on Regions of interest can be trained based on the known target region of the object to be detected in the previous image.

The motion vector residual of the object to be detected in the next image can be input into the target detection network based on Regions of interest, and the known target region of the object to be detected in the previous image can be taken as the region of interest of the target detection network based on Regions of interest, to train the target detection network based on Regions of interest. That is, the motion vector residual with three channels can be input into the target detection network based on Regions of interest, and the target detection network based on Regions of interest can be trained based on the known target region of the object to be detected in the previous image.

The motion vector and the motion vector residual of the object to be detected in the next image can be input into the target detection network based on Regions of interest, and the known target region of the object to be detected in the previous image can be taken as the region of interest generated by the target detection network based on Regions of interest, to train the target detection network based on Regions of interest. That is, The motion vector with two channels and the motion vector residual with three channels can be input into the target detection network based on Regions of interest, and the target detection network based on Regions of interest can be trained based on the known target region of the object to be detected in the previous image. Compared with the former two methods, an effect of training the target detection network based on Regions of interest is better, according to the motion vector with two channels and the motion vector residual with three channels.

Figure 5:
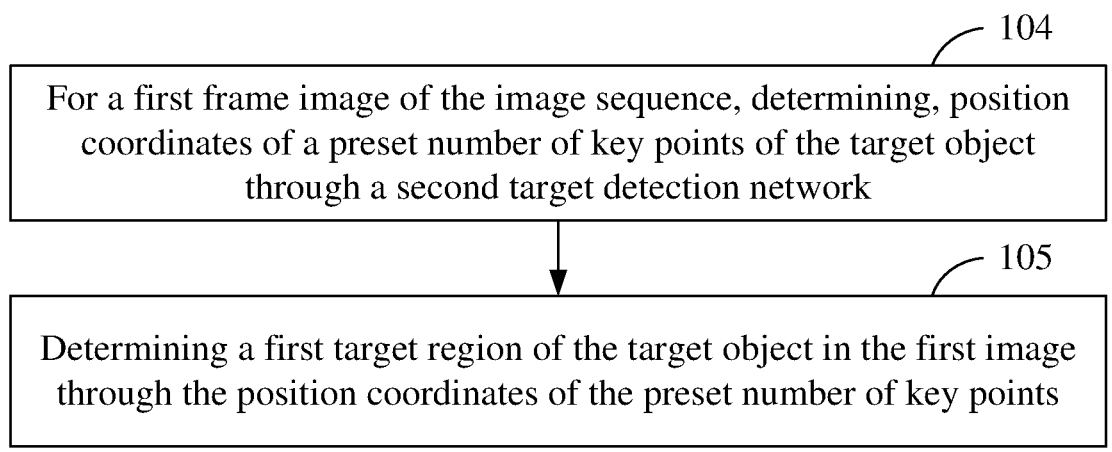
FIG. 5 is a flowchart of the target object tracking method in accordance with an embodiment of the present disclosure.
Figure 6:
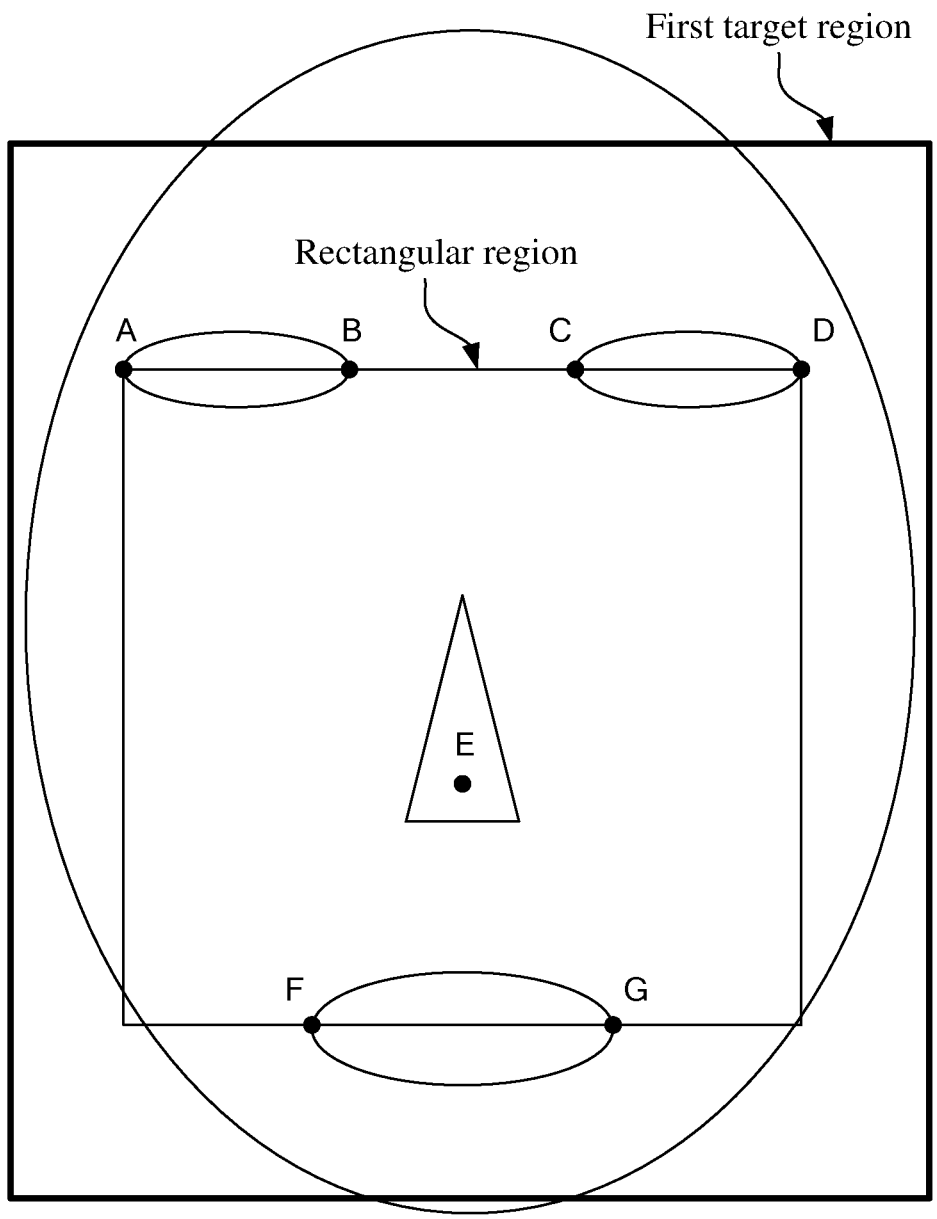
FIG. 6 is a schematic view of face recognition in accordance with an embodiment of the present disclosure.

Referring to FIG. 5, in some embodiments, the target object tracking method can further include:

step 104, for a first image of the image sequence, determining position coordinates of a preset number of key points of the target object through a second target detection network Taking a human face as an example, the number of the key points can be set according to actual requirements, the more the key points are, the more accurate and the slower the tracking is, and in order to improve the detection speed, seven key points are selected in the embodiment, but are not limited thereto. For example, seven key points can be determined through a mtcnn network (Multi-task convolutional neural network), and specifically, an image including the human face therein can be input into the mtcnn network, and positions of the seven key points of A~G can be obtained. The positions of the seven key points are shown in FIG. 6, and a key point E is at the tip of the nose.

step 105, determining a first target region of the target object in the first image through the position coordinates of the preset number of key points The first target region is the known target region required to determine the predicted target region of the target object in the next image. That is, the first target region can be configured to predict the target region of the target object in the next image.

Figure 7:
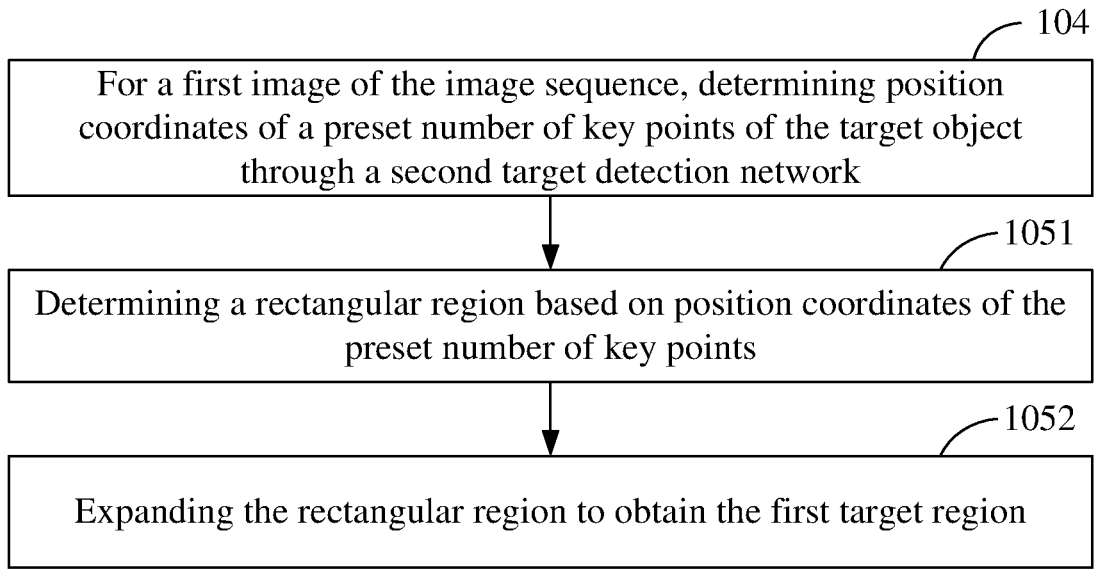
FIG. 7 is a detailed flowchart of the target object tracking method of FIG. 5.

Referring to FIG. 7, the step 105 can include the following steps:

step 1051, determining a rectangular region based on the position coordinates of the preset number of key points.

Referring to FIG. 6, a position of the human face can be determined by positions of the seven key points of each face. After the positions of the seven key points of the face are obtained, a minimum bounding rectangular region can be determined based on the seven key points, as shown in a dotted box of FIG. 6, which is a center position of the face.

step 1052, expanding the rectangular region to obtain the first target region.

The dotted box in FIG. 6 is the center of the face, but an area covered the face by the dotted box is small. Therefore, the dotted box can be expanded by taking a center point of the dotted box as the center, to obtain the first target region as shown in FIG. 6. For example, for the human face, a width of the dotted box can be expanded outward respectively from the left and the right by 0.3 times, that is, a width of the first target region is 1.6 times the width of the dotted box; the dotted box is expanded upward by 0.6 times a height of the dotted box, and then expanded downward by 0.2 times the height of the dotted box, in this way, a height of the first target region is 1.8 times the height of the dotted box. At this time, the first target region that has obtained can be regarded as a face box in the image.

After obtaining the first target region of the first image, the first target region can be taken as a corresponding known target region during determining the predicted target region of the target object in the second image, similarly, the target region of the target object in the second image can be taken as a corresponding known target region during determining the predicted target region of the target object in a third image, and so on.

It should be noted that, the above description is based on the human face as an example, but the embodiment of the present disclosure is not limited thereto, for other target objects, the rectangular region can be determined according to the key points based on characteristics of different objects, and the rectangular region is correspondingly expanded, to obtain the first target region including the target object.

The above target object tracking method first obtains the image sequence including the target object, then analyzes the plurality of images in the image sequence, determines the motion vector and the motion vector residual of the target object in the current image, and then inputs the motion vector, the motion vector residual and the known target region of the target object in the previous image into the first target detection network, to obtain the predicted target region of the target object in the current image, thereby implementing to track the target object in the current image. Only the motion vector, the motion vector residual and the known target region of the target object in the previous image are required to be input into the target detection network when determining the predicted target region, and the motion vector, the motion vector residual and the known target region are much smaller than data of two images in the conventional method, therefore, not only the calculation amount can be reduced, but also the calculation speed of tracking the target object can be improved.

It should be understood that sequence numbers of the steps in the above embodiments do not imply orders to be performed, sequences to perform each process shall be determined by its functions and internal logics, rather than to constitute any limitations to perform the embodiments of the present disclosure.

Figure 8:
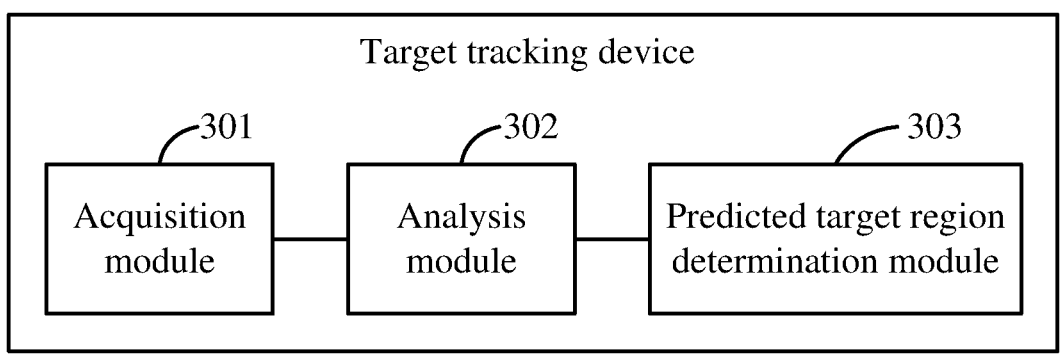
FIG. 8 is a block diagram of a target object tracking apparatus in accordance with an embodiment of the present disclosure.

FIG. 8 shows a block diagram of a target object tracking device according to an embodiment of the present disclosure, corresponding to the target object tracking method described in the above embodiment. For convenience of description, only portions related to the embodiment of the present disclosure are shown.

Referring to FIG. 8, the target object tracking apparatus can include an acquisition module 301, an analysis module 302 and a predicted target region determination module 303.

The acquisition module 301 is configured to obtain an image sequence including a target object, wherein the image sequence includes a plurality of images;

the analysis module 302 is configured to analyze the plurality of images, to determine a motion vector and a motion vector residual of the target object in a current image; and The predicted target region determination module 303 is configured to input the motion vector, the motion vector residual and a known target region of the target object in a previous image into a first target detection network, to determine a predicted target region of the target object in the current image.

Figure 9:
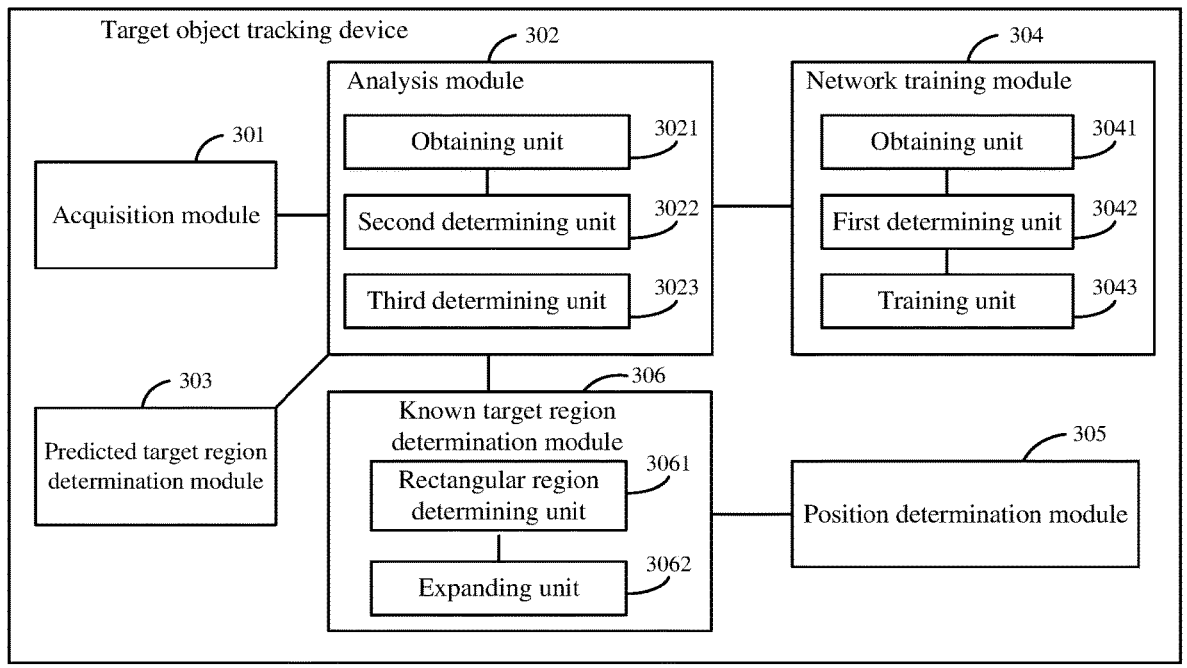
FIG. 9 is a detailed block diagram of the block diagram of a target object tracking apparatus in accordance with an embodiment of the present disclosure.

Optionally, referring to FIG. 9, the apparatus can further include a network training module 304 configured to train the first target detection network;

the network training module 304 including:

an obtaining unit 3041 configured to obtain an image to be trained, wherein the image to be trained includes an object to be detected;

a first determining unit 3042 configured to, for two adjacent images of the image to be trained, determine the motion vector and/or the motion vector residual of the object to be detected in a next image, and the known target region of the object to be detected in the previous image; and a training unit 3043 configured to train the first target detection network based on the motion vector and/or the motion vector residual of the object to be detected in the next image, and the known target region of the object to be detected in the previous image.

Optionally, the first target detection network is a target detection network based on Regions of interest, the training unit 3043 is specifically configured to:

input the motion vector and/or the motion vector residual of the object to be detected in the next image into the target detection network based on Regions of interest, and use the known target region of the object to be detected in the previous image as a region of interest of the target detection network based on Regions of interest; and train the target detection network based on Regions of interest through the motion vector and/or the motion vector residual of the object to be detected in the next image, and the region of interest.

Optionally, referring to FIG. 9, the apparatus can further include:

a position determination module 305 configured to, for a first image of the image sequence, determine position coordinates of a preset number of key points of the target object through a second target detection network; and a known target region determination module 306 configured to determine a first target region of the target object in the first image through the position coordinates of the preset number of key points. The first target region is the known target region required to determine the predicted target region of the target object in the next image.

Optionally, referring to FIG. 9, the known target region determination module 306 can include:

a rectangular region determining unit 3061 configured to determine a rectangular region based on position coordinates of the preset number of key points; and an expanding unit 3062 configured to expand the rectangular region to obtain the first target region.

In a possible implementation, the analysis module 302 is specifically configured to:

determine the motion vector and the motion vector residual of the target object in the current image, according to the position of the target object in the previous image, and the position of the target object in the current image.

In a possible implementation, when an image includes a plurality of objects therein, each object corresponding to an identification; referring to FIG. 9, the analysis module 302 can include:

an obtaining unit 3021 configured to obtain positions of the plurality of objects in the previous image and in the current image;

a second determining unit 3022 configured to determine the position of the target object in the previous image, and the position in the current image based on an identification of the target object and identifications of the plurality of objects; and a third determining unit 3023 configured to determine the motion vector and the motion vector residual of the target object in the current image, according to the position of the target object in the previous image, and the position of the target object in the current image.

It should be noted that information interaction and execution processes between the above devices/units are based on the same conception as the embodiments of the present disclosure, therefore, specific functions and technical effects brought by the above devices/units can be detailed in the embodiments of the present method, which will not be repeated here.

One of ordinary skill in the art can be clearly understood that: for convenient and simple description, the above functional units and modules are only split to illustrate with examples. In a practical application, different functional units and modules can be assigned to implement the above functions according to needs, that is, internal structures of the apparatus can be split into different functional units or modules to complete all or part of the functions described above. Each functional unit or each module in embodiments of the present disclosure can be integrated in a processing unit, or each unit can physically exist separately, or two or more units can be integrated in a unit. The above-mentioned integrated units can be realized in the form of hardware or software functional units. In addition, specific names of each functional unit and each module are only to conveniently distinguish with each other, but are not limited to the protection scope of the present disclosure. A specific working process of the units and modules in the above system can be referred to the corresponding process in the embodiment of the above method, which is not repeated here.

Figure 10:
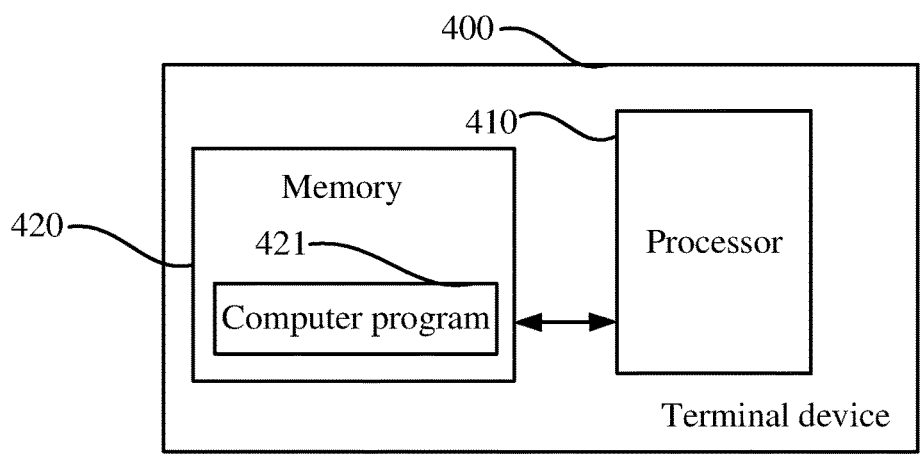
FIG. 10 is a block diagram of a block diagram of a terminal device in accordance with an embodiment of the present disclosure.

Referring to FIG. 10, a terminal device 400 according to an embodiment of the present disclosure can include: at least one processor 410, a memory 420, and computer programs stored in the memory 420 and performed by the at least one processor 410, when the computer programs are performed by the processor 410, the terminal device 400 can be configured to implement steps of the target object tracking method above mentioned.

As an example rather than a limitation, the target object tracking method provided in the foregoing embodiments can be applied to mobile phones, tablets, wearable devices, on-board devices, augmented reality (AR)/virtual reality (VR) devices, laptops, ultra-mobile personal computers (UMPCs), netbooks, personal digital assistants (PDAs) and other terminal devices. A specific type of the terminal device is not limited in the embodiment of the present disclosure.

For example, the terminal device 40 can be a station (ST) in a WLAN, a cellular telephone, a cordless telephone, a session initiation protocol (SIP) telephone, a wireless local loop (WLL) station, a personal digital assistant (PDA) device, a handheld device with wireless communication function, a computing device or other processing devices connected to wireless modems, an on-board device, a vehicle networking terminal, a computer, a laptop, a handheld communication device, a handheld computing device, a satellite wireless device, a wireless modem card, a set top box (STB), a customer premise equipment (CPE) and/or other devices for communication on wireless systems and next generation communication systems, such as a mobile terminal in a 5G network or a mobile terminal in a future evolved public land mobile network (PLMN) network.

As an example rather than a limitation, when the terminal device 400 is a wearable device, the wearable device can also be a general term for intelligently designing daily wear and developing wearable devices by using wearable technologies, such as glasses, gloves, watches, clothes and shoes. The wearable device is a portable device that is directly worn on the body or integrated into users' clothes or accessories, and is not only a hardware device, but also implements powerful functions through software support, data interaction and cloud interaction. The general wearable smart device has the advantages of full-featured, large-scale, implementing complete or partial functions without relying on a smart phone, such as a smart watch or smart glasses, and only focuses on a certain type of application functions that need to be used with other devices such as smart phones, various smart bracelets and smart jewelry for monitoring physical signs.

Figure 11:
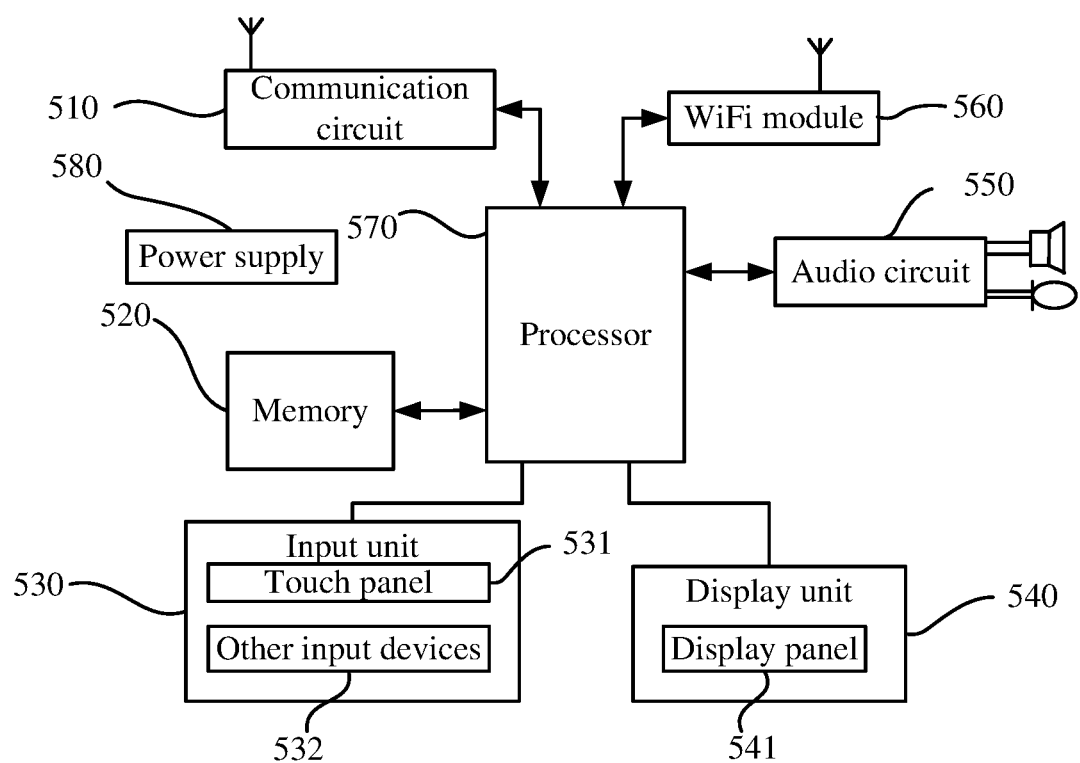
FIG. 11 is a block diagram of a computer provided for the target object tracking method in accordance with an embodiment of the present disclosure.

Taking an example that the terminal device 400 is a computer, FIG. 11 shows a block diagram of a partial structure of the terminal device 400 (as the computer) provided by the embodiment of the present disclosure. Referring to FIG. 11, the computer can include components such as a communication circuit 510, a memory 520, an input unit 530, a display unit 540, an audio circuit 550, a wireless fidelity (WiFi) module 560, a processor 570, and a power supply 580. One of ordinary skill in the art can be understand that the computer shown in FIG. 11 is intended to constitute a limitation of the mobile phone, and can include more or fewer components than that of FIG. 11, or a combination of some components, or different component arrangements.

The following describes each component of the computer in detail below with reference to FIG. 11:

The communication circuit 510 can be configured to receive and transmit signals during information transmission and reception or communication. In particular, the communication circuit 510 receives image samples from an image capturing device, and then sends to the processor 570 for processing; in addition, image acquisition instructions are sent from the communication circuit 510 to the image capturing device. Typically, the communication circuit includes, but is not limited to, an antenna, at least one amplifier, a transceiver, a coupler, a low noise amplifier (LNA), a duplexer, and so on. In addition, the communication circuit 510 can also communicate with networks and other devices via wireless communication. The above wireless communication can use any communication standard or protocol, including, but not limited to, a global system of mobile communication (GSM), a general packet radio service (GPRS), a code division multiple access (CDMA), a wideband code division multiple access (WCDMA), a long term evolution (LTE), an e-mail, and a short messaging service (SMS), etc.

The memory 520 can be configured to store software programs and modules, and the processor 570 performs various functional applications of the computer and data processing by operating the software programs and modules stored in the memory 520. The memory 520 can mainly include a program storage region configured to store an operating system, an application program required by at least one function (such as a sound playing function, an image playing function, etc.), and a data storage region configured to store data (such as audio data, a phonebook, etc.) created according to the use of the computer, etc. Furthermore, the memory 520 can include a high speed random access memory, and a non-volatile memory, such as s at least one disk storage device, a flash memory, or other volatile solid-state storage devices.

The input unit 530 can be configured to receive input numbers or character information and generate signal input related to users' settings and function controls of the computer. Specifically, the input unit 530 can include a touch panel 531 and other input devices 532. The touch panel 531, also known as a touch screen, can collect users' touch operations on or near the touch panel 531 (for example, operations of the user on or near the touch panel 531 by using any suitable object or accessory such as a finger or a stylus pen), and drive a corresponding connection device, according to a preset program. Alternatively, the touch panel 531 can include two parts: a touch detection device and a touch controller. The touch detection device is configured to detect a touch direction of a user, and detect a signal brought by touch operations and then transmit the signal to the touch controller, and the touch controller is configured to receive touch information from the touch detection device, convert the touch information into touch point coordinates, send the touch point coordinates to the processor 570, and receive and perform commands sent by the processor 570. In addition, the touch panel 531 can be implemented by various types such as a resistive type, a capacitive type, an infrared ray, and a surface acoustic wave. The input unit 530 can further include the other input devices 532 in addition to the touch panel 531. In particular, the other input devices 532 can include, but are not limited to, one or more of a physical keyboard, a function key (such as a volume control key, a switch key, etc.), a trackball, a mouse, a joystick, and so on.

The display unit 540 can be configured to display information input by a user or information provided to the user, and various menus of the computer. The display unit 540 can include a display panel 541 configured in a form of a liquid crystal display (LCD), or an organic light-emitting diode (OLED). Furthermore, the touch panel 531 can cover the display panel 541, and when the touch panel 531 detects a touch operation on or near the touch panel 531, the touch operation is transmitted to the processor 570 to determine a type of a touch event, and then the processor 570 provides a corresponding visual output on the display panel 541, according to the type of the touch event. Although in FIG. 11, the touch panel 531 and the display panel 541 are used as two independent components to implement input and output functions of the computer, in some embodiments, the touch panel 531 and the display panel 541 can be integrated to implement the input and output functions of the computer.

The audio circuit 550 can provide an audio interface between the user and the computer, and transmit electrical signals converted from audio data that has received, to a speaker, and then the speaker can convert the electrical signals into sound signals for output; on the other hand, the speaker converts the collected sound signals into the electrical signals, and then the audio circuit 550 receives the electrical signals and converts into audio data, and then outputs the audio data to the processor 570 for processing, finally, the audio data after being processed by the processor 570 is sent to another computer through the communication circuit 510, or the audio data is output to the memory 520 for further processing.

A WiFi is a short-range wireless transmission technology, and the computer can help users send and receive e-mails, browse web pages and access streaming media through the WiFi module 560, which can provide a wireless broadband internet access for the users. Although the WiFi module 560 is shown in FIG. 11, it can be understood that the WiFi module 560 does not belong to an essential constitution of the computer, so that the WiFi module 560 can be omitted entirely as needed within the protection scope without changing the essence of the present disclosure.

The processor 570 is a control center of the computer, connects various parts of the entire computer using various interfaces and wires, performs various functions and processes data of the computer by operating or executing software programs and/or modules stored in the memory 520 and invoking data stored in the memory 520, so as to monitor the entire computer. Alternatively, the processor 570 can include one or more processing units; preferably, the processor 570 can be integrated to an application processor mainly configured to process operating systems, user interfaces and application programs, etc., and a modulation and demodulation processor mainly configured to process wireless communications. It can be understood that the above modulation and demodulation processor cannot be integrated into the processor 570.

The computer also includes a power supply 580 (such as a battery) for supplying power to various components. Preferably, the power supply 580 is logically connected with the processor 570 through a power management system that provides management of charging, discharging, and power consumption.

A computer readable storage medium according to an embodiment of the present disclosure is configured to store computer programs, when the computer programs are performed by a processor, the terminal device can be configured to implement steps of the target object tracking method above mentioned.

A computer program product according to an embodiment of the present disclosure is provided and performed by the terminal device to implement steps of the target object tracking method mentioned above.

The integrated units can be stored in a computer readable memory if implemented in the form of software program modules and sold or used as a separate product. Based on this understanding, all or part of the steps in the method of the above embodiment in the present disclosure can be implemented by computer program instructions of relevant hardware which can be stored in a computer readable storage medium, the computer program can be performed by the processor to implement the steps in the various methods of the above embodiments. Furthermore, the computer program includes computer program codes, which can be in a form of source codes, object codes, executable files or some intermediate forms, etc. The computer readable medium can include: any entities or devices capable of carrying the computer program codes to the devices/terminal devices, a recording medium, a computer Memory, a Read-Only Memory (ROM), a Random Access Memory (RAM), an electrical carrier signal, a telecommunication signal, and a software distribution medium such as a U disk, a mobile hard disk drive, a diskette or a CD. In some jurisdictions, in accordance with legislation and patent practice, computer readable storage medium do not include electrical carrier signals and telecommunications signals.

In the above embodiments, the description of each embodiment has its own emphasis, and parts without detailed description in one embodiment can be referred to relevant description of other embodiments.

One of ordinary skill in the related art can be aware that various illustrative units and algorithm steps described in connection with the embodiments disclosed herein can be implemented as electronic hardware or combinations of computer software and electronic hardware. Whether these functions are performed in hardware or software modes depends on a specific application of the technical solution and design constraints. Professionals can use different methods for each specific application to achieve the functions described, but such implementation should not be considered outside the scope of this application.

It should be understood that the disclosed apparatus/network equipment and method in the embodiments provided by the present disclosure can be implemented in other ways. For example, the embodiments of the apparatus/network equipment described above are merely schematic; for example, the splitting of the modules or units is merely a splitting of logical functions, which can also be realized in other ways; for example, multiple units or components can combined or integrated into another system, or some features can be ignored or not implemented. On the other hand, the coupling, direct coupling or communication connection shown or discussed can be achieved through some interfaces, indirect coupling or communication connection between devices or units can electrical, mechanical or otherwise.

The units described as separation parts can or can't be physically separated, and the parts displayed as modules can or can't be physical units, that is, they can be located in one place, or can be distributed on a plurality of network units. Some or all of the units can be selected according to actual needs to implement the purpose of the present disclosure.

What is claimed is:

1. A target object tracking method comprising:
   obtaining an image sequence including a target object, wherein the image sequence includes a plurality of images;
   analyzing the plurality of images, to determine a motion vector and a motion vector residual of the target object in a current image, wherein the motion vector residual is obtained by removing the same part of the current image and a previous image of the current image; and
   inputting the motion vector, the motion vector residual and a known target region of the target object in a previous image into a first target detection network, to determine a predicted target region of the target object in the current image;
   wherein the method further comprises training the first target detection network, wherein the first target detection network is a target detection network based on regions of interest, the step of training the first target detection network comprising:
   obtaining a plurality of images to be trained, wherein each image to be trained includes an object to be detected;
   for every two adjacent images of the images to be trained, determining the motion vector and the motion vector residual of the object to be detected in a next image, and the known target region of the object to be detected in the previous image;
   inputting the motion vector and the motion vector residual of the object to be detected in the next image with different channels into the target detection network based on regions of interest, and using the known target region of the object to be detected in the previous image as a region of interest of the target detection network based on regions of interest; and
   training the target detection network based on regions of interest through the motion vector, the motion vector residual of the object to be detected in the next image, and the region of interest.

2. The target object tracking method as claimed in claim 1, further comprising:
   encoding a video image to obtain the image sequence, comprising:
   obtaining the video image including the target object;
   for each target image in the video image, dividing the target image into a plurality of macro blocks with preset sizes, and calculating a pixel value corresponding to each macro block;

taking two adjacent images from each target image, and calculating similarity of the two adjacent images based on the pixel value of each macro block of the two adjacent images; and dividing a plurality of target images with similarity meeting preset requirements into a group to be encoded, to obtain the image sequence, wherein only complete data of a first target image is reserved, and other target images are calculated according to corresponding previous target images thereof.

3. The target object tracking method as claimed in claim 1, wherein the method further comprises:

for a first image of the image sequence, determining position coordinates of a preset number of key points of the target object through a second target detection network; and determining a first target region of the target object in the first image through the position coordinates of the preset number of key points, wherein the first target region is a known target region required to determine the predicted target region of the target object in the next image.

4. The target object tracking method as claimed in claim 3, wherein the step of determining the first target region of the target object in the first image through the position coordinates of the preset number of key points, comprises:

determining a rectangular region based on the position coordinates of the preset number of key points; and expanding the rectangular region, to obtain the first target region.

5. The target object tracking method as claimed in claim 4, wherein the step of analyzing the plurality of images, to determine the motion vector and the motion vector residual of the target object in the current image, comprises:

determining the motion vector and the motion vector residual of the target object in the current image, according to the position of the target object in the previous image, and the position of the target object in the current image.

6. The target object tracking method as claimed in claim 4, wherein when the image comprises a plurality of objects therein, each object corresponding to an identification, the target object is any one of the plurality of objects; and the step of analyzing the plurality of images, to determine the motion vector and the motion vector residual of the target object in the current image, comprises:

obtaining positions of the plurality of objects in the previous image and in the current image;

determining a position of the target object in the previous image, and a position in the current image based on an identification of the target object and identifications of the plurality of objects; and determining the motion vector and the motion vector residual of the target object in the current image, according to the position of the target object in the previous image, and the position of the target object in the current image.

7. The target object tracking method as claimed in claim 6, wherein the identification of the same object is unchanged in each of subsequent images, a corresponding relationship of each object between the two images is determined, according to the identification of each object.

8. A terminal device comprising:
a processor; and
a memory that stores one or more programs, when executed by the processor, cause the processor to:

obtain an image sequence including a target object, wherein the image sequence includes a plurality of images;

analyze the plurality of images, to determine a motion vector and a motion vector residual of the target object in a current image, wherein the motion vector residual is obtained by removing the same part of the current image and a previous image of the current image; and input the motion vector, the motion vector residual and a known target region of the target object in a previous image into a first target detection network, to determine a predicted target region of the target object in the current image;

wherein the first target detection network is a target detection network based on regions of interest, the one or more programs further cause the at least one processor to:

train the first target detection network, the step of training the first target detection network comprising:

obtain a plurality of images to be trained, wherein each image to be trained includes an object to be detected;

for every two adjacent images of the images to be trained, determining the motion vector and/or the motion vector residual of the object to be detected in a next image, and the known target region of the object to be detected in the previous image;

input the motion vector and the motion vector residual of the object to be detected in the next image with different channels into the target detection network based on regions of interest, and using the known target region of the object to be detected in the previous image as a region of interest of the target detection network based on regions of interest; and train the target detection network based on regions of interest through the motion vector, the motion vector residual of the object to be detected in the next image, and the region of interest.

9. The terminal device as claimed in claim 8, wherein the processor further:

for a first image of the image sequence, determines position coordinates of a preset number of key points of the target object through a second target detection network; and determines a first target region of the target object in the first image through the position coordinates of the preset number of key points, wherein the first target region is a known target region required to determine the predicted target region of the target object in the next image.

10. The terminal device as claimed in claim 9, wherein the processor further:

determines a rectangular region based on the position coordinates of the preset number of key points; and expands the rectangular region, to obtain the first target region.

11. The terminal device as claimed in claim 10, wherein the processor further:

determines the motion vector and the motion vector residual of the target object in the current image, according to the position of the target object in the previous image, and the position of the target object in the current image.

12. The terminal device as claimed in claim 10, wherein when the image comprises a plurality of objects therein, each object corresponding to an identification, the target object is any one of the plurality of objects; and the processor further:

obtains positions of the plurality of objects in the previous image and in the current image;

determines a position of the target object in the previous image, and a position in the current image based on an identification of the target object and identifications of the plurality of objects; and determines the motion vector and the motion vector residual of the target object in the current image, according to the position of the target object in the previous image, and the position of the target object in the current image.

13. The terminal device as claimed in claim 12, wherein the identification of the same object is unchanged in each of subsequent images, a corresponding relationship of each object between the two images is determined, according to the identification of each object.

14. The terminal device as claimed in claim 8, the processor further:

encodes a video image to obtain the image sequence, the processor further:

obtains the video image including the target object;

for each target image in the video image, divides the target image into a plurality of macro blocks with preset sizes, and calculating a pixel value corresponding to each macro block;

takes two adjacent images from each target image, and calculating similarity of the two adjacent images based on the pixel value of each macro block of the two adjacent images; and divides a plurality of target images with similarity meeting preset requirements into a group to be encoded, to obtain the image sequence, wherein only complete data of a first target image is reserved, and other target images are calculated according to corresponding previous target images thereof.

\* \* \* \* \*